United States Patent
Dally (10) Patent No.: US 12,161,195 B2
(45) Date of Patent: Dec. 10, 2024

(54) CONDUCTIVE POLYMER RIVETS FOR GROUNDING A SHOE

(71) Applicant: Primal Footing, Inc., Sebastopol, CA (US)

(72) Inventor: Michael Craig Dally, Windsor, CA (US)

(73) Assignee: Primal Footing, Inc., Sebastopol, CA (US)

( * ) Notice: Subject to any disclaimer, the term of this patent is extended or adjusted under 35 U.S.C. 154(b) by 0 days.

(21) Appl. No.: 17/132,285

(22) Filed: Dec. 23, 2020

(65) Prior Publication Data
US 2022/0192313 A1   Jun. 23, 2022

(51) Int. Cl.
*A43B 7/36* (2006.01)
*F16B 19/08* (2006.01)

(52) U.S. Cl.
CPC .............. *A43B 7/36* (2013.01); *F16B 19/08* (2013.01)

(58) Field of Classification Search
CPC ......... A43B 7/36; A43B 13/026; A43B 13/10; H05F 3/02
See application file for complete search history.

(56) References Cited

U.S. PATENT DOCUMENTS

| | | | |
|---|---|---|---|
| 1,728,167 A * | 9/1929 | Olmstead | A43B 7/36 361/224 |
| 2,273,563 A * | 2/1942 | Delamere | A43B 7/36 607/144 |
| 2,710,366 A * | 6/1955 | Stern, Jr. | A43B 7/36 361/224 |
| 2,712,099 A * | 6/1955 | Legge | A43B 7/36 361/224 |
| 2,857,556 A * | 10/1958 | Price | A43B 7/36 361/224 |
| 3,544,841 A * | 12/1970 | Peel | A43B 7/36 361/224 |
| 4,727,452 A * | 2/1988 | Brownlee | A43B 7/36 361/220 |
| 5,653,047 A * | 8/1997 | Franey | A43B 7/36 361/224 |
| 7,471,497 B1 * | 12/2008 | Knight, Sr. | A43B 7/36 361/224 |
| 2007/0000155 A1 * | 1/2007 | Laufer | A43B 7/36 36/136 |
| 2008/0134546 A1 * | 6/2008 | Righetto | A43B 7/36 361/224 |
| 2008/0289217 A1 * | 11/2008 | Horvath | A43B 7/36 36/25 R |
| 2011/0030243 A1 * | 2/2011 | Tersigni | A43B 7/36 12/146 B |

(Continued)

*Primary Examiner* — Sharon M Prange
(74) *Attorney, Agent, or Firm* — McAndrews, Held & Malloy, Ltd.

(57) ABSTRACT

The present technology relates to novel conductive polymer rivets designed to allow a user to ground a shoe, including a sandal. They allow for easy installation into various types of shoes resulting in a comfortable, aesthetic and grounded shoe. The present technology also relates to kits incorporating such conductive polymer rivets with instructions for inserting such rivets into a shoe. The present technology further relates to methods of inserting such conductive polymer rivets into shoes. The present technology also relates to shoes with the present conductive polymer rivets inserted therein.

18 Claims, 10 Drawing Sheets

(56) References Cited

U.S. PATENT DOCUMENTS

| | | | |
|---|---|---|---|
| 2018/0235313 A1* | 8/2018 | Tersigni | H01B 1/24 |
| 2019/0183205 A1* | 6/2019 | Cheskin | A43B 3/163 |
| 2022/0125156 A1* | 4/2022 | Fu | A43B 7/36 |
| 2022/0151335 A1* | 5/2022 | Stanley | A43B 17/006 |

* cited by examiner

CONDUCTIVE POLYMER RIVETS FOR GROUNDING A SHOE

CROSS-REFERENCE TO RELATED APPLICATIONS

[Not Applicable]

FEDERALLY SPONSORED RESEARCH OR DEVELOPMENT

[Not Applicable]

BACKGROUND OF THE APPLICATION

Primitive human cultures lived their lives in constant electrical connection with the earth by either going barefoot or wearing leather-soled sandals, moccasins, and shoes which were conductive when wet. When a person is electrically grounded to the earth, his or her biology has access to a supply of electrons allowing him or her to function as his or her ancestors did, entrained to the 24-hour circadian rhythm of the earth's normal diurnal hormone patterns.

Electric grounding to the earth has been shown to reduce inflammation. For example, when a person is electrically grounded to the earth, free electrons spread throughout the body, which can have an antioxidant effect. Thermal photography taken before and after grounding has demonstrated a notable reduction in inflammation and normal thermal symmetry after just 30 minutes of maintaining electrical connection with the earth, e.g. through going barefoot or electrically grounded footwear.

Electric grounding to the earth has also been shown to regulate circadian rhythm. Studies have shown how exposing the body's biology to the Schumann resonance via earthing helps to re-synchronizes cortisol hormone secretion more in alignment with the natural 24-hour circadian rhythm. Normalization of circadian cortisol profiles from prolonged earthing has also shown improved sleep and reduced pain and stress.

Insulating rubber soles were introduced into the footwear industry in the early 1900's as a result of rubber's superior grip and wear resistance compared to that of leather. To this day, rubber soles continue to dominate the market due to rubber's high performance properties and moldability. Insulated modern rubber shoes and other non-conductive materials, however, interrupt the human body's ability to electrically connect with the earth in the way humans have lived on earth for millennia.

Grounded footwear has been developed to promote grounding to the earth and earthing. Present grounded footwear falls into two categories: (1) footwear manufactured with grounding components and (2) aftermarket grounding devices for user insertion into footwear. There are two main types of footwear manufactured with grounding components: (1) antistatic discharge (ESD) footwear and (2) earthing shoes. Antistatic discharge (ESD) footwear are designed to protect those working with sensitive electrical components, like computer components, from dangerous static charge transmission. This type of footwear works by grounding the wearer to an indoor floor, preventing any charge accumulation in the body via the friction of walking on the ground. Earthing shoes are designed to ground users to the earth to restore connection to the 24-hour circadian rhythm of the earth, which has been shown to regulate hormone production, boost the immune system, and reduce inflammation as discussed above.

There have previously been three main types of aftermarket grounding devices for user insertion into footwear: (1) foot grounding straps—for both EDS and earthing shoe purposes; (2) conductive copper rivets to be installed through the sole of the shoe for earthing shoe benefits; and (3) conductive bands of rubber to be adhered to footwear routed from the outsole, around the upper, to the insole used for their earthing shoe benefits. These devices, however, have certain drawbacks, e.g. they are not easy to install, not aesthetically pleasing, are intrusive to the shoe's feel, etc.

Significant research and engineering goes into making shoes that are shock absorbing, lightweight, breathable, high traction, durable, cost effective and relatively easy to manufacture. Each person's individual lifestyle, fashion sense, physique and application requires different shoe specifications for different use cases. Making cost effective earthing shoes that appeal to any substantial portion of the diverse footwear market, while remaining cost effective, is challenging.

SUMMARY

Conductive polymer rivets according to the present application will fulfill the needs of those seeking grounding to the earth while maintaining the stylistic and functional needs one looks for when picking footwear (e.g. sneakers, sandals, boots, etc.). Installing a conductive polymer rivet through the sole of a shoe will serve as a conduit to electrically ground the user to the surface they walk on. Users wearing footwear with conductive polymer rivets installed through the sole that stand on any bare earth grounded surface (rock, dirt, grass, etc.) may provide their body with a slight negative charge, the same to that of earth which serves as a supply of negative electrons.

The present conductive polymer rivets are designed to be a fast, convenient, and permanent way for the user to ground a shoe (e.g. sneakers, sandals, boots, etc.). They allow for easy installation resulting in a comfortable result. They have a more disguised visual aesthetic than antistatic discharge (ESD) foot grounding straps and electrically conductive bands adhered to shoes in prior methods. Their soft and compressive composition is more comfortable underfoot than hard conductive copper rivets or chunky and hard conductive rubber plugs through the sole in prior methods. Their soft and compressive composition also allows them to be more easily installed than the prior hard conductive copper rivets.

In one embodiment, a grounded shoe according to the invention comprises a body portion; a sole connected to the bottom of the body portion and the sole comprising a top portion, a bottom portion and a thickness; and a rivet inserted through the sole comprising; a head positioned on the top portion of the sole; a barrel connected to the head and traversing the entire thickness of the sole; a barb connected to the barrel and positioned on the bottom of the sole; and a removal region at the bottom of the barb wherein the removal region comprises a flat surface resulting from removal of a pull tab after insertion of the rivet wherein the rivet comprises a conductive polymer.

In one embodiment, a conductive rivet for grounding a shoe according to the invention comprises a head; a barrel connected to the head; a barb connected to the barrel; and a pull tab connected to the barb wherein the conductive rivet comprises a conductive polymer. In one embodiment, a kit for grounding a shoe according to the invention comprises such a conductive rivet and instructions for insertion into a shoe.

In one embodiment, a method of grounding a shoe comprises the steps of: providing a conductive rivet comprising a head, a barrel connected to the head, a barb connected to the barrel, and a pull tab connected to the barb wherein the conductive rivet comprises a conductive polymer; inserting a tip of the pull tab into a hole in an upper portion of a sole of the shoe; pulling the pull tab through the sole of the shoe such that the head is positioned on the top portion of the sole of the shoe, the barrel entirely traverses the sole of the shoe and the barb contacts a bottom portion of the sole of the shoe following insertion; and removing a portion of the pull tab after insertion. In some embodiments, the shoe can be a sandal.

The head can be configured to be positioned on a top portion of a sole of the shoe after insertion. For example, the head can have a substantially flat, disc-like shape. The head can have a geometric shape around the centerline of the rivet selected from the group consisting of a circle, an oval, a rectangle, a triangle, a square, a pentagon, a hexagon, a heptagon, an octagon, a nonagon, a decagon and an n-gon. The head can have a height of about 1 to about 8 mm, preferably about 3 to about 5 mm. The head can have a diameter of about 8 to about 25 mm.

The barrel can be configured to entirely traverse a sole of the shoe after insertion. For example, the barrel can have a substantially cylindrical or prismatic shape. The barrel can have a narrower cross sectional diameter than the head and the barb. The vertical edges of the barrel can be substantially straight, concave or convex. A cross section of the barrel can have a geometric shape around the centerline of the rivet selected from the group consisting of a circle, an oval, a rectangle, a triangle, a square, a pentagon, a hexagon, a heptagon, an octagon, a nonagon, a decagon and an n-gon. The barrel can have a height of about 2 to about 30 mm. The barrel can have a diameter of about 3 to about 9 mm, preferably about 5 to about 7 mm.

The barb can be configured to contact a bottom portion of a sole of the shoe after insertion. For example, the barb cross section can increase in diameter in a direction from the removal region to the barrel. The barb can have a substantially conical or frustoconical shape. The barb can have a geometric shape around the centerline of the rivet selected from the group consisting of a circle, an oval, a rectangle, a triangle, a square, a pentagon, a hexagon, a heptagon, an octagon, a nonagon, a decagon and an n-gon. The barb can have a diameter of about 5 to about 10 mm, preferably about 7.5 to about 9 mm. The conductive rivet can further comprise barb relief cuts made parallel to a pull direction of the conductive rivet. The barb relief cuts can have a depth of about 1 to about 5 mm, preferably 1 to about 3 mm.

The pull tab can be configured for removal after insertion. For example, the pull tab can have a substantially conical shape with a pointy tip. The pull tab can have a geometric shape around the centerline of the rivet selected from the group consisting of a circle, an oval, a rectangle, a triangle, a square, a pentagon, a hexagon, a heptagon, an octagon, a nonagon, a decagon and an n-gon. The pull tab cross section can decrease in diameter in a direction travelling down the pull tab and away from the barb. The pull tab can have a height of about 30 to about 90 mm. The conductive polymer rivet can further comprise a cut indicator on the barb to indicate the minimum amount of material to be left when cutting the pull tab after insertion.

The conductive polymer can contain a conductive filler. For example, the conductive polymer can be compression molded with 1-40% by volume, preferably 20-40% by volume conductive powder filler. The conductive filler can have a volume resistivity ranging from 0.006-10 $\Omega \cdot cm^3$. The conductive polymer can have a volume resistivity of $10^1$-$10^{12}$ $\Omega \cdot cm^3$. The conductive polymer can be selected from the group consisting of a carbon filled thermoplastic, carbon filled silicone, nickel coated graphite filled silicone, silver coated aluminum filled silicone, silver coated nickel filled silicone, silver coated copper filled silicone, carbon filled thermal plastic and combinations thereof. The conductive polymer can have a hardness of 10-70 Shore A, preferably 20-70 Shore A. The conductive rivet can contain additional components. For example, the conductive rivet can further comprise a non-conductive reinforcement filler.

These and other advantages and novel features of the present invention, as well as details of illustrated embodiments thereof will be more fully understood from the following description and from the figures.

The foregoing summary, as well as the following detailed description of certain embodiments of the present application, will be better understood when read in conjunction with the appended drawings. For the purposes of illustration, certain embodiments are shown in the drawings and described herein. It should be understood, however, that the claims are not limited to the arrangements and instrumentality shown in the attached drawings or the detailed description. Furthermore, the appearance shown in the drawings is one of many ornamental appearances that can be employed to achieve the stated functions of the system.

DETAILED DESCRIPTION

The present technology relates to conductive polymer rivets designed to allow a user to ground a shoe. They allow for easy installation into various types of shoes resulting in comfortable, aesthetic and grounded shoes. The present technology also relates to kits incorporating such conductive polymer rivets with instructions for inserting such rivets into a shoe. The present technology further relates to methods of inserting such conductive polymer rivets into shoes. The present technology also relates to shoes with the present conductive polymer rivets inserted therein.

Before describing several exemplary embodiments, it is to be understood that the disclosure is not limited to the details of construction or process steps set forth herein. Other embodiments are possible and the methods described herein are capable of practiced or being carried out in various ways.

Reference throughout this specification to "one embodiment," "certain embodiments," "various embodiments," "one or more embodiments" or "an embodiment" means that a particular feature, structure, material, or characteristic described in connection with the embodiment is included in at least one embodiment of the disclosure. Thus, the appearances of the phrases such as "in one or more embodiments," "in certain embodiments," "in various embodiments," "in one embodiment" or "in an embodiment" in various places throughout this specification are not necessarily referring to the same embodiment. Furthermore, the particular features, structures, materials, or characteristics may be combined in any suitable manner in one or more embodiments.

Figure 1:
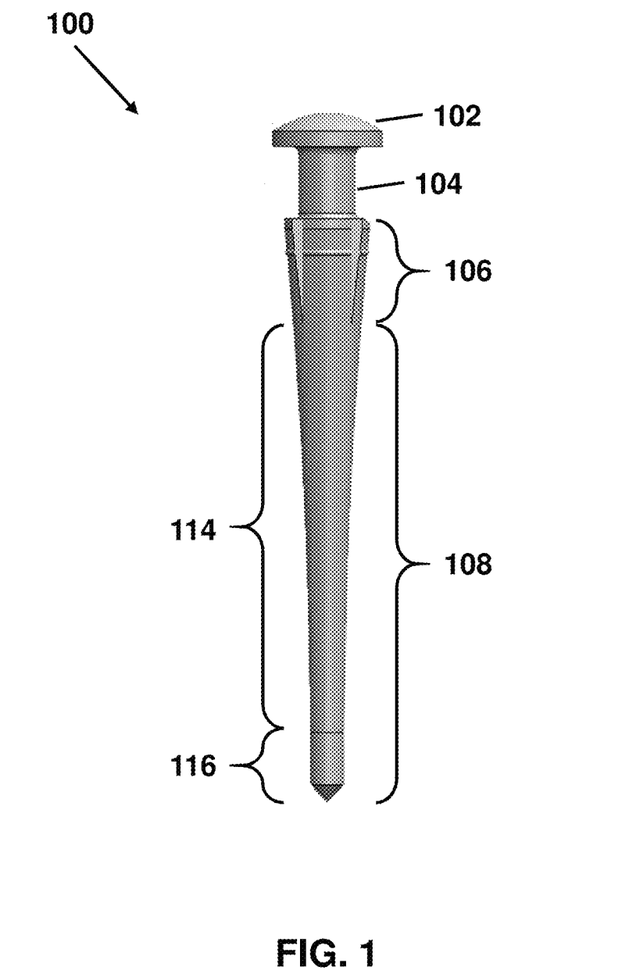
FIG. 1 shows a front view of a conductive polymer rivet in accordance with an embodiment of the present invention.
Figure 2:
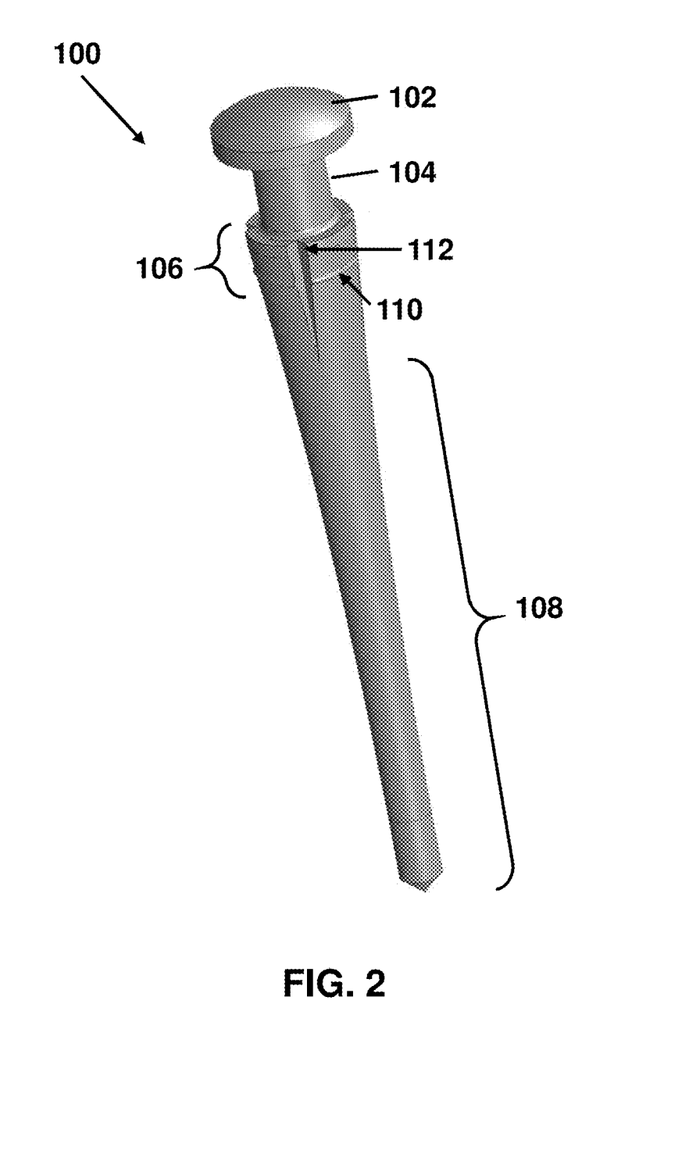
FIG. 2 shows an angled view of a conductive polymer rivet in accordance with an embodiment of the present invention.
Figure 3:
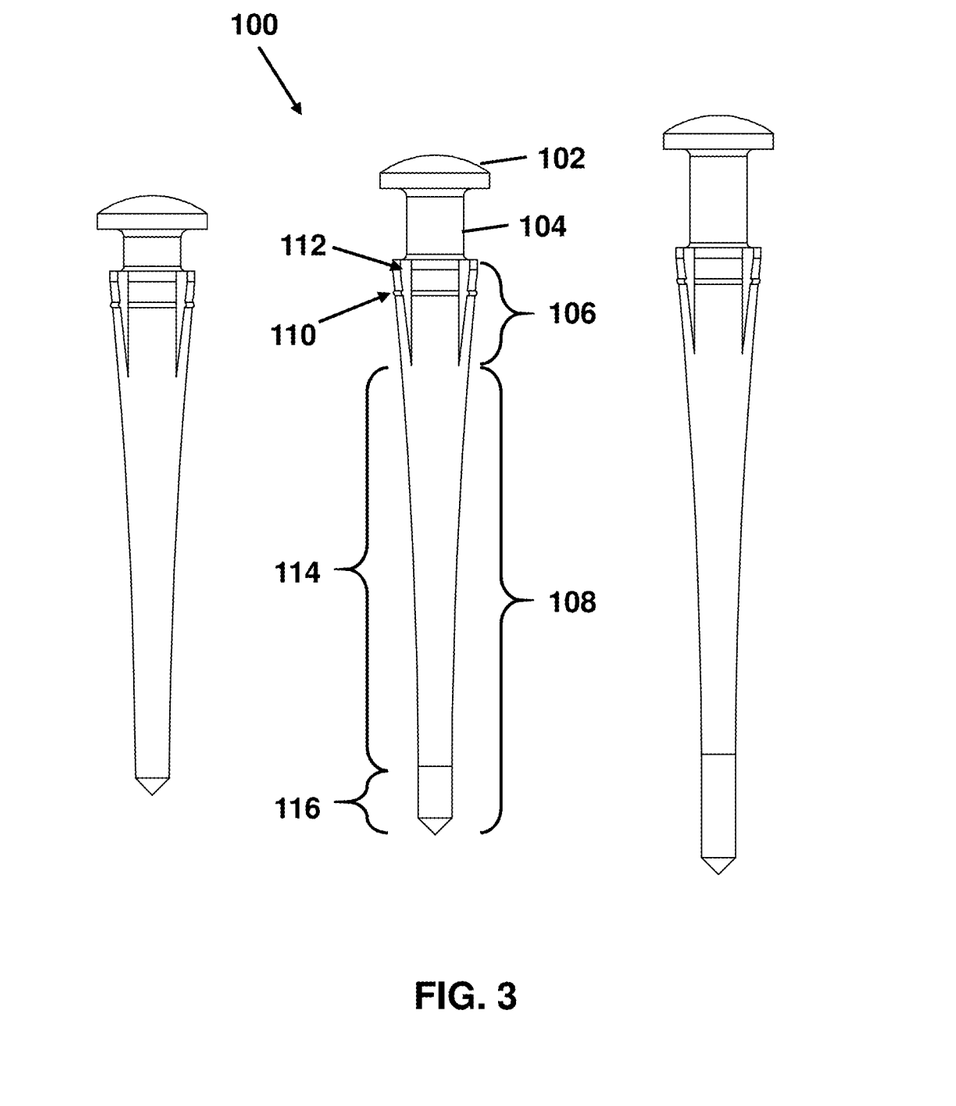
FIG. 3 shows various sizes of conductive polymer rivets in accordance with embodiments of the present invention.

FIGS. 1-3 show conductive polymer rivets in accordance with embodiments of the present invention. The present conductive rivets 100 for grounding a shoe comprise a head 102; a barrel 104 connected to the head 102; a barb 106 connected to the barrel 104; and a pull tab 108 connected to the barb 106 wherein the conductive rivet 100 comprises a conductive polymer. The conductive rubber rivet 100 can also have a cut indicator 110 on the barb 106 to indicate the minimum amount of material to be left when cutting the pull tab 108 after insertion The conductive rivet 100 can also have barb relief cuts 112 made parallel to a pull direction of the conductive rivet 100. The barb 106 and a portion of the pull tab 108 combine to form the cone 114. The pointed or sharp bottom of the pull tab 108 forms the tip 116. The present conductive polymer rivets 100 can be provided in the form of a kit for grounding a shoe comprising one or more of the conductive rivets 100 along with instructions for insertion into a shoe.

FIGS. 4-9 show a conductive polymer rivet in accordance with an embodiment of the present invention at different points during the insertion process (at the beginning, middle and end of the process, respectively). The present method of grounding a shoe (e.g. sneakers, sandals, boots, etc.). 120 comprises the steps of: (1) providing a conductive rivet 100 comprising a head 102, a barrel 104 connected to the head 102, a barb 106 connected to the barrel 104, and a pull tab 108 connected to the barb 106 wherein the conductive rivet 100 comprises a conductive polymer; (2) inserting a tip 116 of the pull tab 108 into a hole in a top portion 126 of a sole 124 of the shoe 120; (3) pulling the pull tab 108 through the sole 124 of the shoe 120 such that the head 102 is positioned on the top portion 126 of the sole 124 of the shoe 120, the barrel 104 entirely traverses the sole 124 of the shoe 120 and the barb 106 contacts a bottom portion 128 of the sole 124 of the shoe 120 following insertions; and (4) removing a portion of the pull tab 108 after insertion. The method results in production of a grounded shoe according to embodiments of the present invention.

Figure 4:
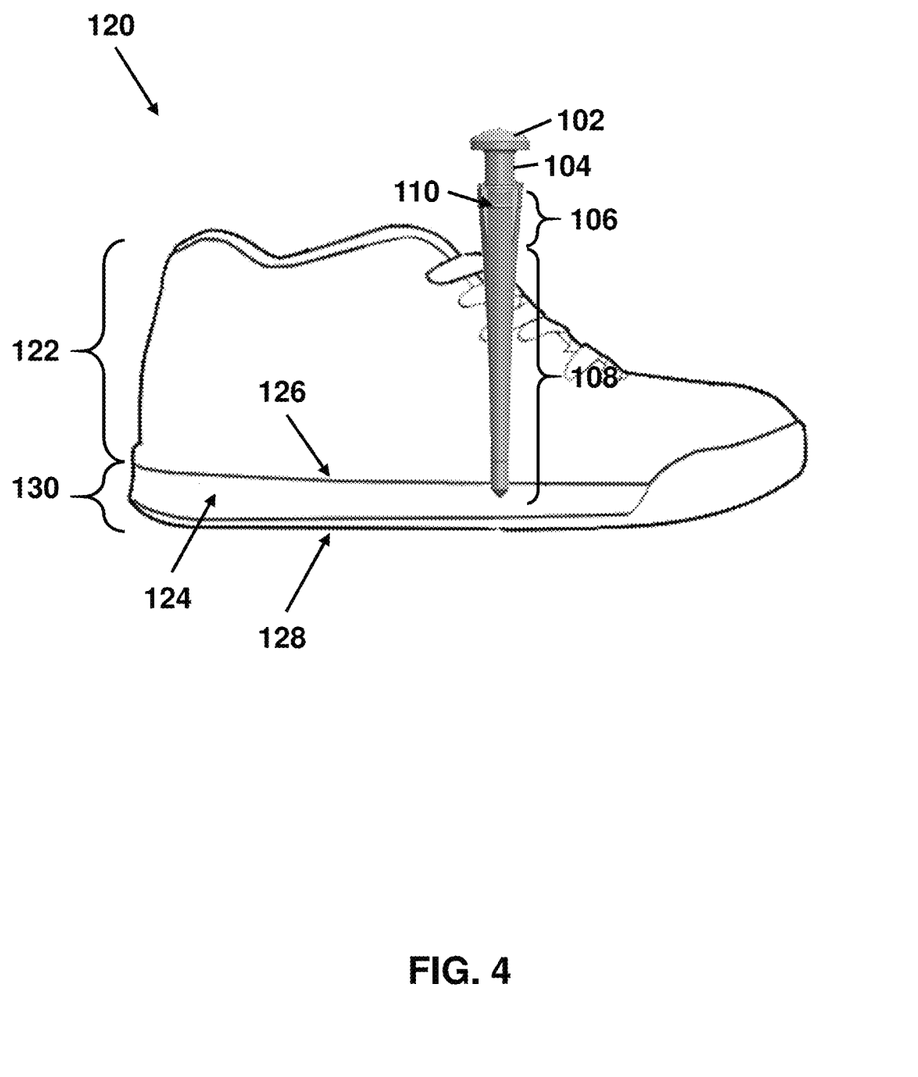
FIG. 4 shows a conductive polymer rivet in accordance with an embodiment of the present invention during insertion into a shoe.
Figure 5:
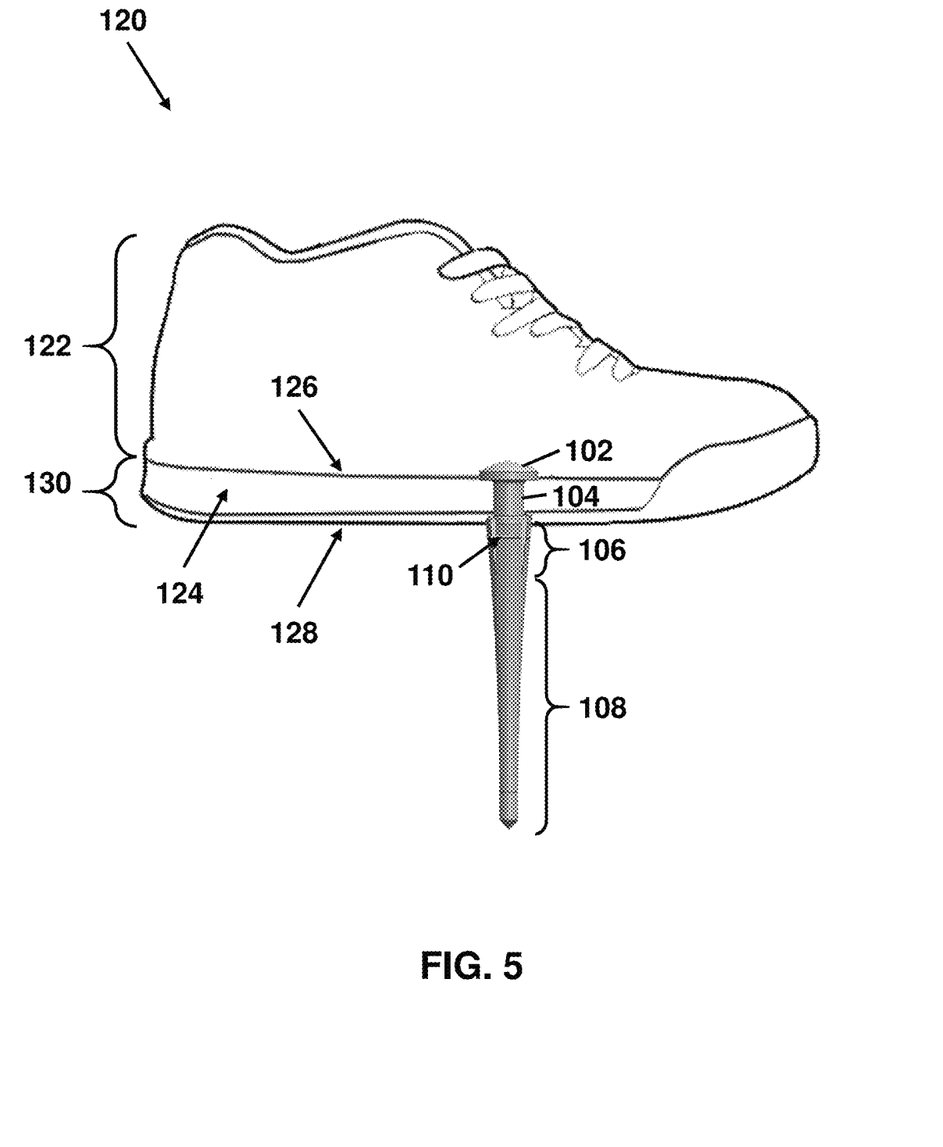
FIG. 5 shows a conductive polymer rivet in accordance with an embodiment of the present invention inserted into a shoe prior to removal of the pull tab.
Figure 6:
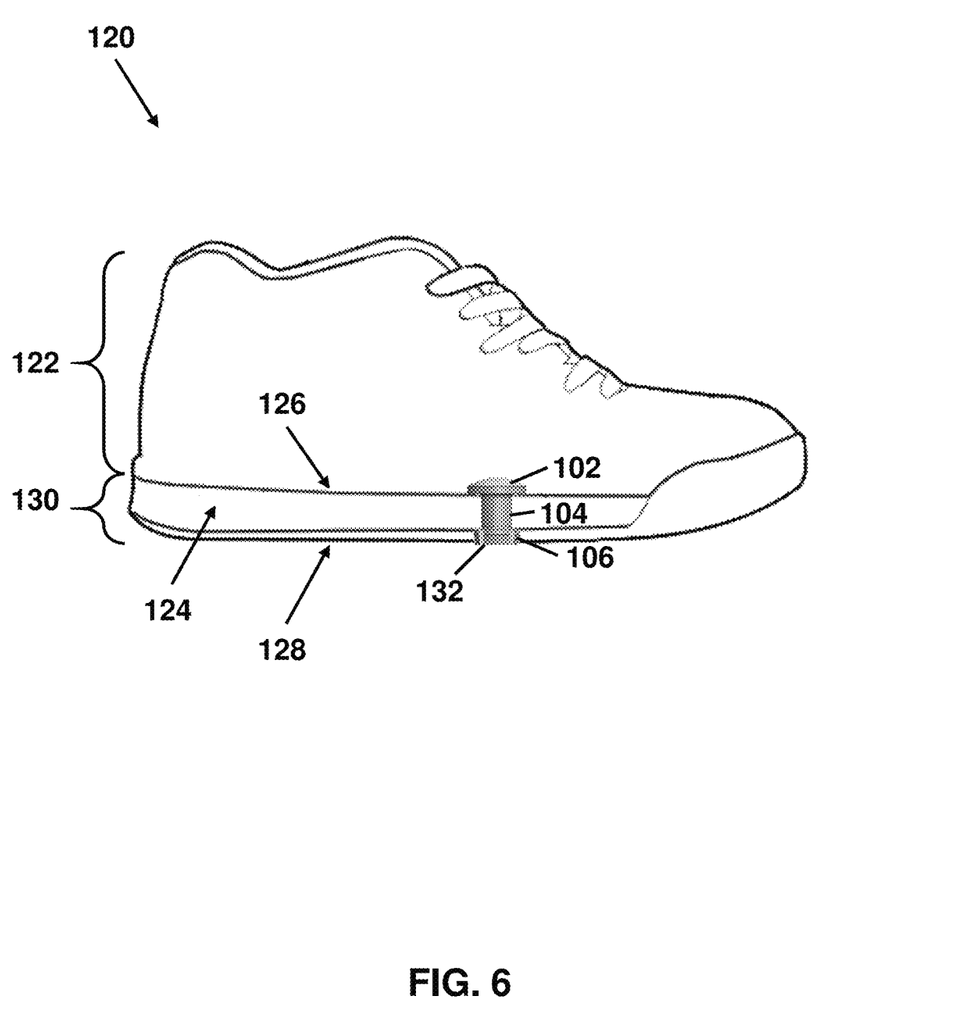
FIG. 6 shows a conductive polymer rivet in accordance with an embodiment of the present invention inserted into a shoe after removal of the pull tab.
Figure 7:
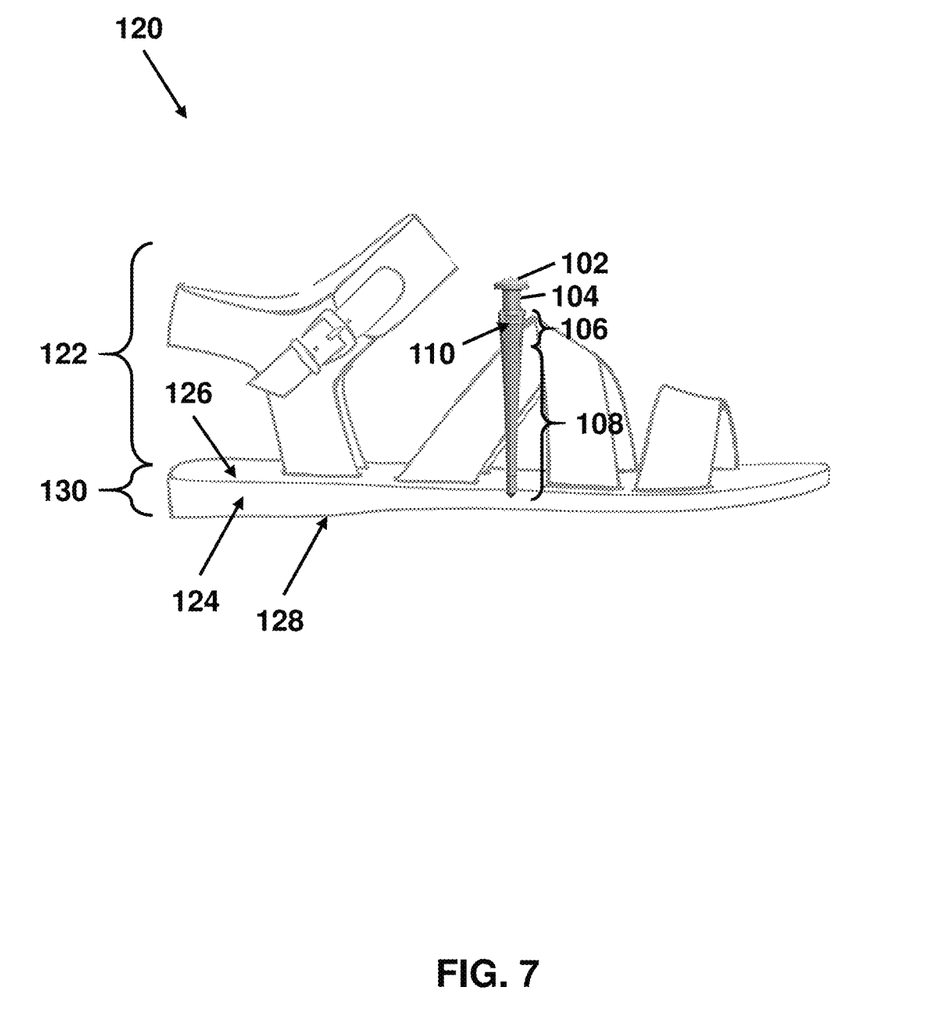
FIG. 7 shows a conductive polymer rivet in accordance with an embodiment of the present invention during insertion into a sandal.
Figure 8:
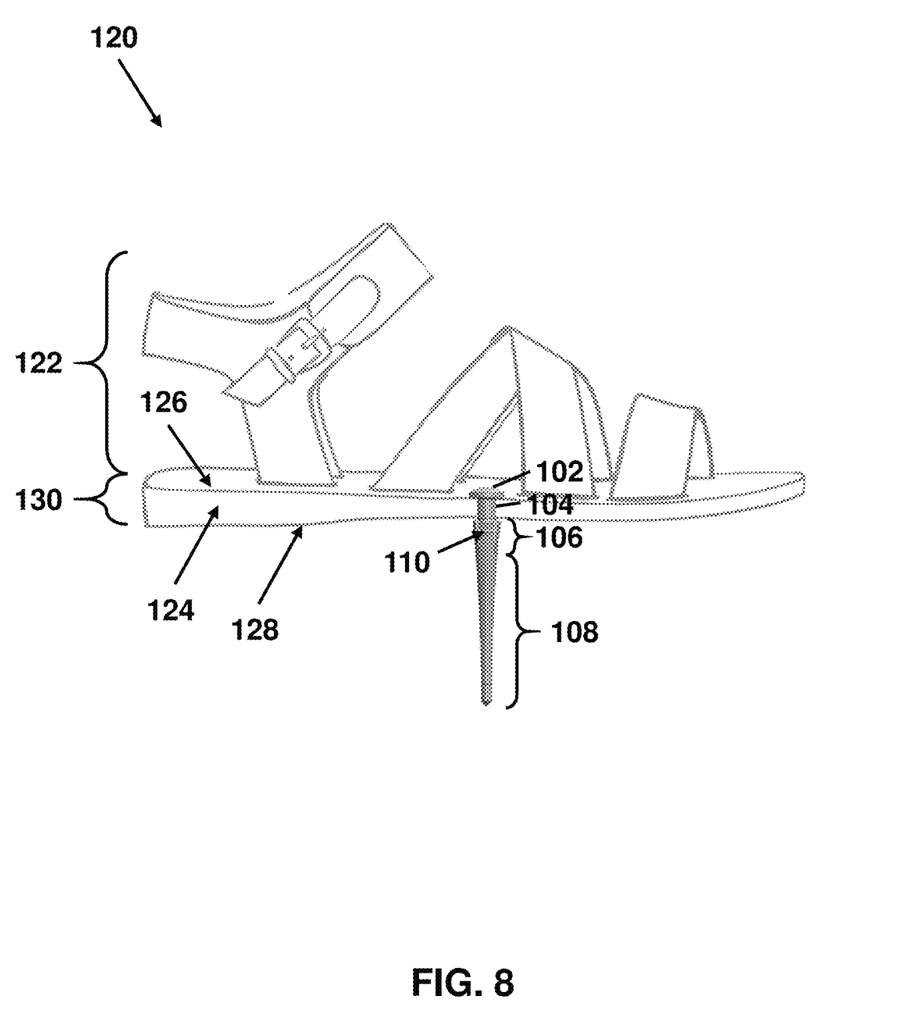
FIG. 8 shows a conductive polymer rivet in accordance with an embodiment of the present invention inserted into a sandal prior to removal of the pull tab.
Figure 9:
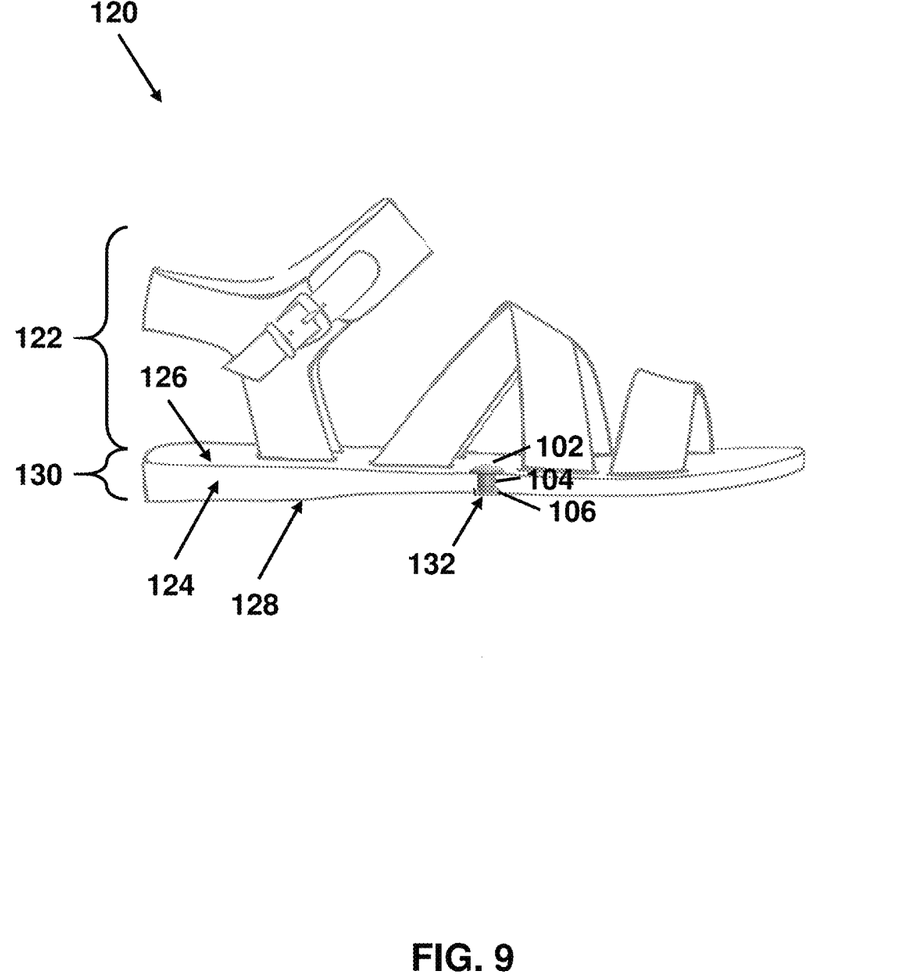
FIG. 9 shows a conductive polymer rivet in accordance with an embodiment of the present invention inserted into a sandal after removal of the pull tab.

FIGS. 4 and 7 show the conductive polymer rivet 100 during step (2) discussed above, i.e. during insertion of the tip 116 of the pull tab 108 into a hole in a top portion 126 of the sole 124 of the shoe 120. FIGS. 5 and 8 show the conductive polymer rivet 100 after step (3) discussed above, i.e. inserted into the shoe 120 prior to removal of the pull tab 108. FIGS. 6 and 9 show the conductive polymer rivet 100 after step (4) discussed above, i.e. inserted into the shoe 120 after removal of the pull tab 108.

The present method results in a grounded shoe according to embodiments of the present invention. FIGS. 6 and 9 show the present grounded shoe which comprises a body portion 122; a sole 124 connected to the bottom of the body portion 122 and the sole comprising a top portion 126, a bottom portion 128 and a thickness 130; and a rivet 100 inserted through the sole 124 comprising: a head 102 positioned on the top portion 126 of the sole 124; a barrel 104 connected to the head 102 and traversing the entire thickness 130 of the sole 124; a barb 106 connected to the barrel 104 and positioned on the bottom 128 of the sole 124; and a removal region 140 at the bottom of the barb wherein the removal region 140 comprises a flat surface resulting from removal of a pull tab 108 after insertion of the rivet 100 wherein the rivet 100 comprises a conductive polymer.

The head 102 is located at the top of the present conductive polymer rivet 100. The head 102 is configured to be positioned, e.g. to rest or sit flat, on a top portion 126 of the sole 124 of the shoe 120 after insertion. The head 102 is the portion of the conductive polymer rivet 100 that makes contact with the user's foot while the shoe 120 is being worn in order to provide electrical contact with the ground and allow for electrical transmission.

The head 102 can have any size and shape that allows it to be positioned, e.g. to rest or sit flat, on a top portion 126 of the sole 124 of the shoe 120 after insertion. The size and shape of the head 102 can have sufficient diameter or size to prevent the head 102 from sliding through the sole 124 of the shoe 120. The size and shape of the head 102 can also be sufficient to make adequate contact with the user's foot during wear, while not so tall as to cause discomfort to the user's foot.

In some embodiments, the head 102 has a substantially flat, disc-like shape as shown in FIGS. 1-9. In some embodiments, the head 102 has a domed top as shown in FIGS. 1-9. The head 102 can have a generally flat geometric shape around the centerline of the conductive polymer rivet 100. For example, the shape can be a circle (as shown in FIGS. 1-9), an oval, a rectangle, a triangle, a square, a pentagon, a hexagon, a heptagon, an octagon, a nonagon, a decagon, an n-gon (where n is the number of sides of the geometric shape), etc.

In some embodiments, the head 102 has a height of about 1 mm to about 8 mm, e.g. about 1 mm, about 2 mm, about 3 mm, about 4 mm, about 5 mm, about 6 mm, about 7 mm, about 8 mm and ranges comprising any of the previously cited values as endpoints. In one embodiment, the head 102 has a height of preferably about 2 mm to about 5 mm, e.g. about 2 mm.

In some embodiments, the head 102 has a diameter (i.e. a length of a line through the center that touches two points on the edge of the shape at the longest point) of about 8 mm to about 25 mm, e.g. about 8 mm, about 9 mm, about 10 mm, about 11 mm, about 12 mm, about 13 mm, about 14 mm, about 15 mm, about 16 mm, about 17 mm, about 18 mm, about 19 mm, about 20 mm, about 21 mm, about 22 mm, about 23 mm, about 24 mm, about 25 mm and ranges comprising any of the previously cited values as endpoints. In one embodiment, the head 102 has a diameter of preferably about 8 mm to about 25 mm, e.g. about 10 mm.

The head 102 of the conductive polymer rivet 100 is connected to the barrel 104. The barrel 104 is configured to traverse the entire thickness 130 of the sole 124 of the shoe 120 after insertion. After insertion, the barrel 104 connects the head 102 of the conductive polymer rivet 100 on the top portion 126 of the sole 124 (i.e., the foot-facing portion of the sole which is also sometimes known as the insole) with the barb 106 of the conductive polymer rivet 100 on the bottom portion 128 of the sole 124 of the shoe 120 (i.e., the ground-facing portion of the sole which is sometimes also known as the outsole). The barrel 104 positions the head 102 to rest or sit flat on a top portion 126 of the sole 124 of the shoe 120 after insertion. The barrel 104 positions the barb 106 to rest or sit flat on a bottom portion 128 of the sole 124 of the shoe 120 after insertion.

The barrel 104 can have any size and shape that allows it to traverse the entire thickness 130 of the sole 124 of the shoe 120 while connecting and positioning the head 102 with the barb 106 after insertion. The size and shape of the barrel 104 can have sufficient diameter or size to prevent the head 102 from sliding through the sole 124 of the shoe 120. The size and shape of the barrel can have sufficient diameter or size to prevent the barb 106 from sliding through the sole 124 of the shoe 120. The height and diameter of the barrel 104 can also be sufficient to traverse the entire thickness 130 of the sole 124, while not so large as to cause discomfort to the user's foot. The height and diameter of the barrel 104 in relation to the thickness of the shoe's 120 sole thickness 130 allow for the appropriate amount of conductive polymer rivet 100 deformation and compression, to achieve a secure rivet fit and watertight seal.

In some embodiments, the barrel 104 has a substantially cylindrical or prismatic shape as shown in FIGS. 1-9. In some embodiments, the barrel 104 has a narrower cross sectional diameter than the head 102 and the barb 104 as shown in FIGS. 1-9. The cross section of the barrel 104 can have a generally flat geometric shape around the centerline of the conductive polymer rivet 100. For example, the shape can be a circle (as shown in FIGS. 1-9), an oval, a rectangle, a triangle, a square, a pentagon, a hexagon, a heptagon, an octagon, a nonagon, a decagon, an n-gon (where n is the number of sides of the geometric shape), etc. In some embodiments, the vertical edges of the barrel 104 are substantially straight, concave or convex.

In some embodiments, the barrel 104 has a height of about 2 mm to about 30 mm, e.g. about 2 mm, about 3 mm, about 4 mm, about 5 mm, about 6 mm, about 7 mm, about 8 mm, about 9 mm, about 10 mm, about 11 mm, about 12 mm, about 13 mm, about 14 mm, about 15 mm, about 16 mm, about 17 mm, about 18 mm, about 19 mm, about 20 mm, about 21 mm, about 22 mm, about 23 mm, about 24 mm, about 25 mm, about 26 mm, about 27 mm, about 28 mm, about 29 mm, about 30 mm and ranges comprising any of the previously cited values as endpoints. As shown in FIG. 3 the barrel 104 height can vary based on shoe sole thickness 130, e.g. small, medium and large variations having different barrel 104 heights.

In some embodiments, the barrel 104 has a diameter (i.e. a length of a line through the center that touches two points on the edge of the shape at the longest point) of about 3 mm to about 9 mm, e.g. about 3 mm, about 4 mm, about 5 mm, about 6 mm, about 7 mm, about 8 mm, about 9 mm and ranges comprising any of the previously cited values as endpoints. In one embodiment, the barrel 104 has a diameter of preferably about 5 mm to about 7 mm, e.g. about 5 mm.

The barrel 104 is connected to a barb 106. The barb 104 is connected to a pull tab 108. The pull tab 108 and barb 106 allow for quick, easy and permanent installation of the conductive polymer rivet 100. The pull tab 108 and barb 106 work in unison during insertion. The tip 116 of the pull tab 108 allows it to be easily threaded through a hole cut in the sole 124 of the shoe/sandal 120, from the top portion 126 of the sole 124 (also sometimes known as the insole) through to the bottom portion 128 of the sole 124 (also sometimes known as the outsole). After threading, the barb 106 is positioned, e.g. rests or sits flat, on a bottom portion 128 of the sole 124 of the shoe 120. The portion of the barb 106 and pull tab 108 protruding past the bottom 128 portion of the sole 124 is then cut flush with the bottom of the shoe 120. The edge of the barb 106 that is cut forms the removal region 132. The removal region 132 is flush with the bottom portion 128 of the sole 124 of the shoe 120 and is the portion of the conductive polymer rivet 100 that interfaces and contacts the ground, allowing for electrical transmission.

The barb 106 can have any size and shape that allows it to be threaded through a hole cut in the sole 124 of the shoe 120 and be positioned on a bottom portion 128 of the sole 124 of the shoe 120 after insertion. The size and shape of the barb 106 can have sufficient diameter or size to prevent the barb 106 from sliding through the sole 124 of the shoe 120 after insertion. The shape of the barb 106 allows it to pass through the hole in the sole 124 of the shoe by applying tension to the pull tab 108 during installation, but will not eject after installation when seated on the bottom portion 128 of the sole 124 of the shoe.

In some embodiments, the barb 106 has a substantially frustoconical shape as shown in FIGS. 1-9. In some embodiments, the barb 106 cross section increases in diameter in a direction from the pull tab 108 to the barrel 104 as shown in FIGS. 1-9. In some embodiments, the barb 106 has a cross section with a larger diameter than the barrel 104 as shown in FIGS. 1-9. The cross section of the barb 106 can have a generally flat geometric shape around the centerline of the conductive polymer rivet 100. For example, the shape can be a circle (as shown in FIGS. 1-9), an oval, a rectangle, a triangle, a square, a pentagon, a hexagon, a heptagon, an octagon, a nonagon, a decagon, an n-gon (where n is the number of sides of the geometric shape), etc.

In some embodiments, the barb 106 has a diameter (i.e. a length of a line through the center that touches two points on the edge of the shape at the longest point) of about 5 mm to about 10 mm, e.g. about 5 mm, about 6 mm, about 7 mm, about 8 mm, about 9 mm, about 10 and ranges comprising any of the previously cited values as endpoints. In one embodiment, the barb 106 has a diameter of preferably about 7 mm to about 9 mm, e.g. about 8 mm.

Figure 10:
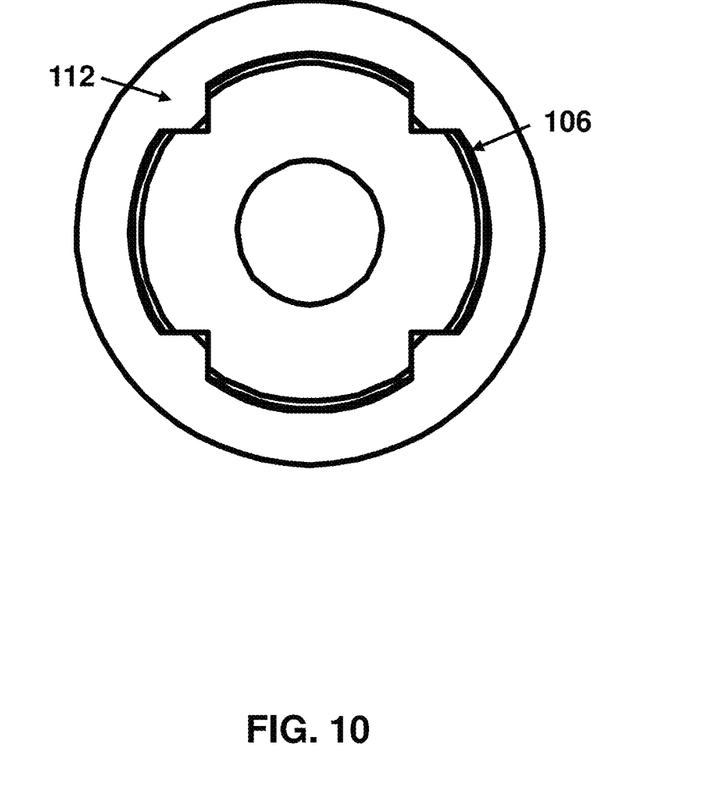
FIG. 10 shows a cross section of a conductive polymer rivet in accordance with an embodiment of the present invention along line A-A.

The barb 106 can optionally include one or more barb relief cuts 112 made up of extruded cuts, made parallel to the pull direction of the conductive polymer rivet 100. Such barb relief cuts 112 reduce the barb's cross sectional volume, which minimizes friction during installation. The cuts can be evenly distributed around the radius of the barb to allow for even relief. FIG. 10 shows a cross section of a conductive polymer rivet 100 with four exemplary barb relief cuts 112.

The barb relief cuts 112 can have a depth of about 1 mm to about 5 mm, e.g. about 1 mm, about 2 mm, about 3 mm, about 4 mm, about 5 mm and ranges comprising any of the previously cited values as endpoints. In one embodiment, the barb relief cuts 112 have a depth of preferably about 1 mm to about 3 mm.

The barb 106 can also optionally include a cut indicator line 110, i.e. a revolving line on the barb to indicate the minimum amount of material that can be left on the barb when cutting the conductive polymer rivet 100 after installation.

The pull tab 108 can have any size and shape that allows it to be easily threaded through a hole cut in the sole 124 of the shoe 120, from the top portion 126 of the sole 124 (also sometimes known as the insole) through to the bottom portion 128 of the sole 124 (also sometimes known as the outsole). The bottom of the pull tab 108 comprises a tip 116. The tip 116 of the pull tab 108 can of any shape and size for easy insertion through the hole (cut to a specific diameter) in the sole 124 of the shoe 120. Once the tip 116 of the pull tab 108 is threaded through the hole in the top portion 126 of the sole 124 of the shoe 120, the user will then be able to finish pulling the pull tab 108 through from the bottom portion 128 of the sole 124 of the shoe 120 with either their hand or pliers. The pull tab 108 and bottom portion of the barb 106 are configured to be removed to be flush with the bottom portion 128 of the sole 124 of the shoe 120 after insertion, as shown in FIGS. 6 and 9.

In some embodiments, the pull tab 108 has a substantially conical shape with pointy tip as shown in FIGS. 1-9. In some embodiments, the pull tab 108 cross section can decrease in diameter in a direction travelling down the pull tab 108 and away from the barb 106, as shown in FIGS. 1-9. The tip 116 of the pull tab 108 can be pointy and narrow for easy insertion through the hole (cut to a specific diameter) in the sole 124 of the shoe 120. The cross section of the pull tab 108 can have a generally flat geometric shape around the centerline of the conductive polymer rivet 100. For example, the shape can be a circle (as shown in FIGS. 1-9), an oval, a rectangle, a triangle, a square, a pentagon, a hexagon, a heptagon, an octagon, a nonagon, a decagon, an n-gon (where n is the number of sides of the geometric shape), etc. In some embodiments, the vertical edges of the pull tab 108 are substantially straight, concave or convex.

In some embodiments, the pull tab 108 has a diameter (i.e. a length of a line through the center that touches two points on the edge of the shape at the longest point) of about 5 mm to about 10 mm, e.g. about 5 mm, about 6 mm, about 7 mm, about 8 mm, about 9 mm, about 10 and ranges comprising any of the previously cited values as endpoints. In one embodiment, the pull tab 108 has a diameter of preferably about 7 mm to about 9 mm, e.g. about 8 mm.

The combination of the barb 106 and the pull tab 108 excluding the tip 116 comprises the cone 114. In some embodiments, the cone 114 has a height of about 20 mm to about 60 mm, e.g. about 20 mm, about 21 mm, about 22 mm, about 23 mm, about 24 mm, about 25 mm, about 26 mm, about 27 mm, about 28 mm, about 29 mm, about 30 mm, about 31 mm, about 32 mm, about 33 mm, about 34 mm, about 35 mm, about 36 mm, about 37 mm, about 38 mm, about 39 mm, about 40 mm, about 41 mm, about 42 mm, about 43 mm, about 44 mm, about 45 mm, about 46 mm, about 47 mm, about 48 mm, about 49 mm, about 50 mm, about 51 mm, about 52 mm, about 53 mm, about 54 mm, about 55 mm, about 56 mm, about 57 mm, about 58 mm, about 59 mm, about 60 mm and ranges comprising any of the previously cited values as endpoints. Preferably, the length of the cone comprises about 30 to about 60 mm, e.g. about 48 mm.

In some embodiments, the tip 116 has a height of about 1 mm to about 30 mm, e.g. about 1 mm, about 2 mm, about 3 mm, about 4 mm, about 5 mm, about 6 mm, about 7 mm, about 8 mm, about 9 mm, about 10 mm, about 11 mm, about 12 mm, about 13 mm, about 14 mm, about 15 mm, about 16 mm, about 17 mm, about 18 mm, about 19 mm, about 20 mm, about 21 mm, about 22 mm, about 23 mm, about 24 mm, about 25 mm, about 26 mm, about 27 mm, about 28 mm, about 29 mm, about 30 mm and ranges comprising any of the previously cited values as endpoints. As shown in FIG. 3 the tip 116 height can vary based on shoe sole thickness 130, e.g. small, medium and large variations having different tip 116 heights. Preferably, the length of the tip comprises about 1 to about 20 mm.

The conductive polymer rivet 100 comprises a conductive polymer. The conductive polymer allows the conductive polymer rivet 100 to make contact between the user's foot while and the ground while the shoe 120 is being worn to allow for electrical transmission. Below is a comparison of different prior and/or potential earthing shoe materials and their relative resistivity and conductivity as well as their classification.

TABLE 1

Comparison Chart of Different Conductive Earthing Shoe Materials

| Material | Resistivity, $\Omega \cdot cm3$ | Classification | Conductivity |
|---|---|---|---|
| Plastic/Rubber | $10^{15}$ | Insulator | None |
| Leather (Dry) | $10^{15}$ | Insulator | None |
| Carbon Filled Thermoplastic | $10^{3}$ | Anti-Static | Low |
| Leather (Wet) | $10^{1}$ | Anti-Static | Low-Medium |
| Carbon Filled Silicone | $10^{1}$ | Anti-Static | Low-Medium |
| Nickel-Coated Graphite-Filled Silicone | $10^{-1}$ | Low Shielding | Medium-Low |
| Silver Filled Silicone | $10^{-3}$ | Shielding & Through Conductivity | Medium |
| Stainless Steel | $10^{-7}$ | Conductive | High |
| Aluminum | $10^{-8}$ | Conductive | High |
| Copper | $10^{-8}$ | Conductive | High |

The information about prior and/or potential earthing shoe materials highlights the problem with modern plastic/rubber/foam soles and explains the use of prior metal conductive rivets to ground a user's sole. It also highlights the conductivity and resistivity of some potential materials for use in the present conductive polymer rivets. In some embodiments, the polymer is thermoplastic, rubber, silicone or mixtures thereof. As shown above, polymers (e.g. thermoplastic, thermoset plastic and elastomers) are typically non-conductive. For this reason, the polymers of the present invention may contain a conductive filler or coated filler (e.g. graphite particles coated with nickel) in order to obtain the desired conductive properties. As shown above, the conductive rivet can comprise carbon-filled thermoplastic, carbon filled silicone, nickel coated graphite filled silicone, silver coated aluminum filled silicone, silver coated nickel filled silicone, silver coated copper filled silicone and combinations thereof. The conductive filler helps to lower the impedance of the polymer used in the rivets, allowing it to conduct ions.

In order to impart conductivity as discussed above the polymer can be compounded with a conductive filler(s) and then compression molded or injection molded with a conductive filler(s). The shape and inherent conductive properties of the filler(s) used will determine how much is needed (% weight) to establish a conductive network and achieve the desired resistivity in the compounded polymer during the molding process. The different fillers range in shapes from particles to nanotubes to fibers resulting in vastly different dispersion densities and interconnectedness of the conductive network they establish resulting in different electrical properties through the polymer when compared by % of weight added. The interconnected 3D shape of the filler's conductive network, and its inherent electrical properties, are what determine the amount of filler needed to achieve the desired reduction in electrical resistance through the polymer. In some embodiments, the filler is 1-30% by weight, alternatively 20-30% by weight, alternatively 5-10% by weight, alternatively 5-7% by weight.

Volume resistivity (the inverse of conductivity) and hardness of the various filled polymer compositions play an important role in the appropriateness of the material for the present conductive polymer rivets. The material must be sufficiently conductive while also having an appropriate hardness (i.e. hard enough to maintain structural integrity but soft enough for easy removal of the pull tab after insertion). The volume resistivity and hardness of the filled polymer materials have been shown to be inversely related, i.e. volume resistivity decreases as hardness increases. This can be seen in the chart below.

TABLE 2

| Carbon Filled Silicone | | | | | | |
|---|---|---|---|---|---|---|
| Durometer Shore A | 20 ± 5 | 30 ± 5 | 40 ± 5 | 50 ± 5 | 60 ± 5 | 70 ± 5 |
| Volume resistivity $\Omega \cdot cm^3$ | 11-18 | 9-16 | 7-14 | 5-12 | 2-10 | 2-8 |
| Nickel Graphite Filled Silicone | | | | | | |
| Durometer Shore A | 20 ± 5 | 30 ± 5 | 40 ± 5 | 50 ± 5 | 60 ± 5 | 70 ± 5 |
| Volume resistivity $\Omega \cdot cm^3$ | 0.4-1 | 0.4-1 | 0.3-1 | 0.2-1 | 0.1-1 | 0.1-1 |
| Silver Coated Aluminum Filled Silicone | | | | | | |
| Durometer Shore A | 20 ± 5 | 30 ± 5 | 40 ± 5 | 50 ± 5 | 60 ± 5 | 70 ± 5 |
| Volume resistivity $\Omega \cdot cm^3$ | 0.012-1 | 0.011-1 | 0.010-1 | 0.009-1 | 0.008-1 | 0.007-1 |
| Silver Coated Nickel Filled Silicone | | | | | | |
| Durometer Shore A | 20 ± 5 | 30 ± 5 | 40 ± 5 | 50 ± 5 | 60 ± 5 | 70 ± 5 |
| Volume resistivity $\Omega \cdot cm^3$ | 0.010-1 | 0.009-1 | 0.008-1 | 0.007-1 | 0.006-1 | 0.005-1 |
| Silver coated Copper Filled Silicone | | | | | | |
| Durometer Shore A | 20 ± 5 | 30 ± 5 | 40 ± 5 | 50 ± 5 | 60 ± 5 | 70 ± 5 |
| Volume resistivity $\Omega \cdot cm^3$ | 0.009-1 | 0.008-1 | 0.007-1 | 0.006-1 | 0.005-1 | 0.004-1 |
| Carbon Filled Thermoplastic | | | | | | |
| Durometer Shore A | 20 ± 5 | 35 ± 5 | 45 ± 5 | 55 ± 5 | 65 ± 5 | 75 ± 5 |
| Volume resistivity $\Omega \cdot cm^3$ | 1600 | 1400 | 1200 | 1000 | 800 | 600 |

As shown above, filling polymers (e.g. silicone and thermoplastics) can achieve a polymer material for the present conductive polymer rivets that has an appropriate hardness (e.g. strong enough to maintain integrity but soft enough for easy removal of the pull tab) and an appropriate conductivity. The volume resistivity of the present polymer materials can range from $10^1$-$10^{12}$ $\Omega \cdot cm^3$, alternatively $10^1$-$10^6$ $\Omega \cdot cm^3$. The hardnesses of the present polymer materials can range from 10-70 Shore A, alternatively 40-60 Shore A.

Non-conductive reinforcement filler may be added to the polymer compound to give the conductive polymer rivets greater material properties making them more resilient during installation and over their lifecycle of use.

Standing on bare earth in footwear with conductive polymer rivets installed through the sole allows ions to conduct between the user and the earth. Standing on any bare earth surface (rock, dirt, grass, etc.) that is inherently conductive will provide the body with a slight negative charge, the same to that of the earth, which serves as a supplier of negative electrons. This can be confirmed by wearing the shoes on the earth and testing using a voltmeter to confirm the user's skin voltage is negligible, or very close to zero volts (eg. <0.04 volts), shared by the earth (i.e. grounded).

Wearing socks does not disrupt the connection between the foot and the conductive polymer rivet due to foot perspiration that wicks into the sock passing on its conductive properties through this barrier. Whatever shoes the user chooses will remain the same with conductive polymer rivets installed as they would be otherwise, with the subtle reminder under the arch of the foot of a soft-coin-shaped-object that keeps the user grounded with each step.

In some embodiments, the present conductive polymer rivets 100 can be provided in the form of a kit that allows a user to ground a shoe. The kit comprises one or more of the conductive rivets 100 along with instructions for insertion into a shoe. The instructions in the kit can outline the present method of grounding a shoe, as shown in FIGS. 4-9 (at the beginning, middle and end of the insertion process, respectively). The present method of grounding a shoe (e.g. sneakers, sandals, boots, etc.). 120 comprises the steps of: (1) providing a conductive rivet 100 according to the present invention; (2) inserting a tip 116 of the pull tab 108 into a hole in a top portion 126 of a sole 124 of the shoe 120; (3) pulling the pull tab 108 through the sole 124 of the shoe 120 such that the head 102 is positioned on the top portion 126 of the sole 124 of the shoe 120, the barrel 104 entirely traverses the sole 124 of the shoe 120 and the barb 106 contacts a bottom portion 128 of the sole 124 of the shoe 120 following insertions; and (4) removing a portion of the pull tab 108 after insertion. The method results in production of a grounded shoe according to embodiments of the present invention.

While the application has been described with reference to certain embodiments, it will be understood by those skilled in the art that various changes may be made and equivalents may be substituted without departing from the scope of the application. In addition, many modifications may be made to adapt a particular situation or material to the teachings of the application without departing from its scope. Therefore, it is intended that the application not be limited to the particular embodiment disclosed, but that the application will include all embodiments falling within the scope of the appended claims.

The invention claimed is:

1. A shoe comprising:
a body portion;
a sole connected to the bottom of the body portion and the sole comprising a top portion, a bottom portion and a thickness; and
a molded rivet extending through the sole comprising:
   a head having a top and bottom portion wherein the bottom portion of the head is positioned on the top portion of the sole;
   a barb positioned on the bottom surface of the bottom portion of the sole;
   a barrel connected to and having a narrower cross section than the head and the barb, the barrel extending between the head and the barb and traversing the entire thickness of the sole; and
   a removable pull tab connected to the barb; wherein the pull tab has a length greater than the sole thickness;
wherein the rivet comprises a conductive polymer.

2. The shoe of claim 1, wherein said head has a substantially flat, disc-like shape.

3. The shoe of claim 1, wherein said barrel has a substantially cylindrical or prismatic shape.

4. The shoe of claim 1, wherein vertical edges of the barrel are substantially straight, concave or convex.

5. The shoe of claim 1, wherein a cross section of the barrel has a geometric shape around the centerline of the rivet and said shape is selected from the group consisting of a circle, an oval, a rectangle, a triangle, a square, a pentagon, a hexagon, a heptagon, an octagon, a nonagon, a decagon and an n-gon.

6. The shoe of claim 1, wherein said barb cross section increases in diameter in a direction from the pull tab to the barrel.

7. The shoe of claim 1, wherein said barb has a substantially conical or frustoconical shape.

8. The shoe of claim 1, wherein said barb has a geometric shape around the centerline of the rivet and said shape is selected from the group consisting of a circle, an oval, a rectangle, a triangle, a square, a pentagon, a hexagon, a heptagon, an octagon, a nonagon, a decagon and an n-gon.

9. The shoe of claim 1, wherein the conductive polymer is compression molded with 1-40% by volume conductive powder filler.

10. The shoe of claim 1, wherein the conductive polymer has a volume resistivity ranging from $10^1$-$10^{12}$ $\Omega \cdot cm^3$.

11. The shoe of claim 1, wherein the conductive polymer is selected from the group consisting of a carbon filled thermoplastic, carbon filled silicone, nickel coated graphite filled silicone, silver coated aluminum filled silicone, silver coated nickel filled silicone, silver coated copper filled silicone, carbon filled thermal plastic and combinations thereof.

12. The shoe of claim 1, wherein the conductive polymer has a hardness of 10-70 Shore A.

13. The shoe of claim 1, wherein the head has a diameter of about 8 to about 25 mm.

14. The shoe of claim 1, wherein the barrel has a height of about 2 to about 30 mm.

15. The shoe of claim 1, wherein the shoe is a sandal.

16. A footwear system comprising
(a) a grounded shoe comprising
   a body portion;
   a sole connected to the bottom of the body portion and the sole comprising a top portion, a bottom portion, and a thickness; and
   a molded rivet comprising: a conductive polymer extending through the sole comprising a head having a top and bottom portion wherein the bottom portion of the head is positioned on the top portion of the sole; a barb positioned on the bottom surface of the bottom portion of the sole wherein the bottom of the barb has a removal region with a flat surface; and a barrel connected to and having a narrower cross section than the head and the barb, the barrel traversing between the head and the barb and traversing the entire thickness of the sole; and
(b) a detached pull tab having a narrower cross section at one end wherein the pull tab has a length greater than the sole thickness.

17. The footwear system of claim 16, wherein said barb cross section increases in diameter in a direction from the removal region to the barrel.

18. The footwear system of claim 16, wherein said barb has a substantially conical or frustoconical shape.

* * * * *